Dec. 19, 1933.   J. H. WAGENHORST   1,939,935
VEHICLE WHEEL
Filed Sept. 1, 1931   2 Sheets-Sheet 1
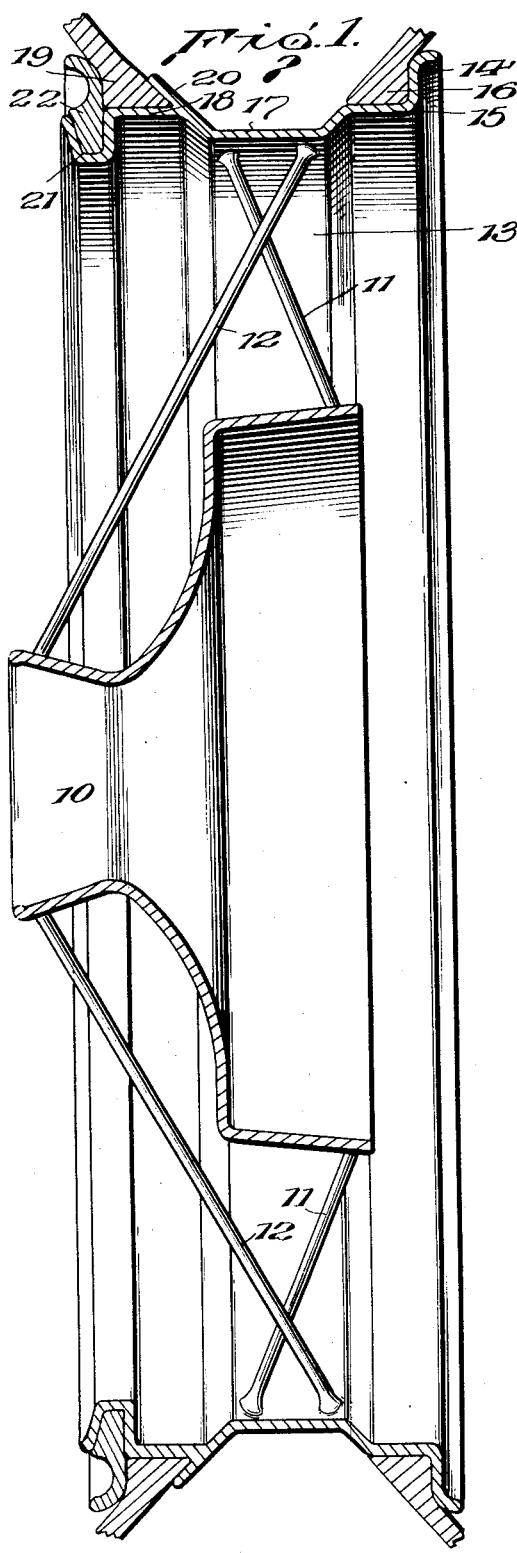
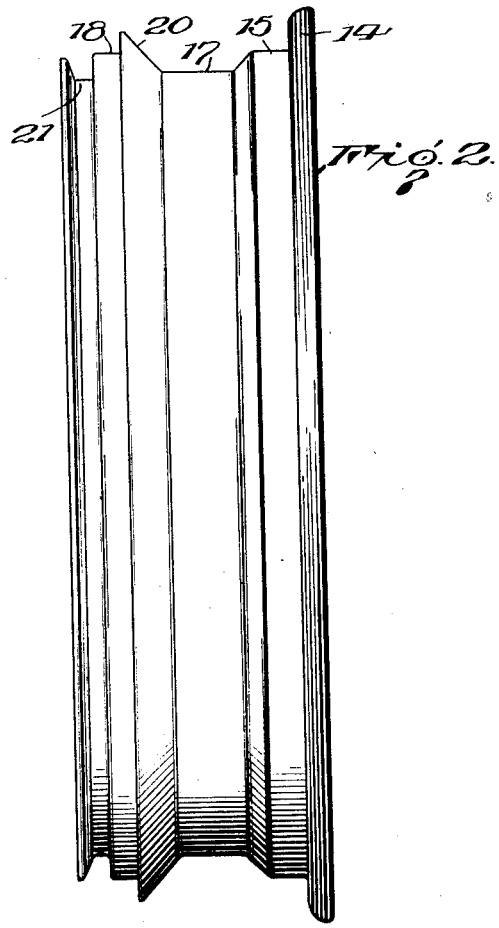
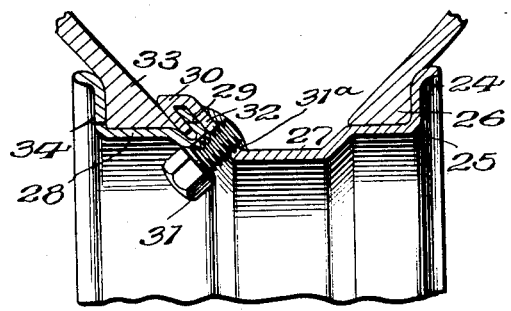
Inventor
James H. Wagenhorst,
By Church & Church
His Attorneys Dec. 19, 1933.  J. H. WAGENHORST  1,939,935
VEHICLE WHEEL
Filed Sept. 1, 1931  2 Sheets-Sheet 2
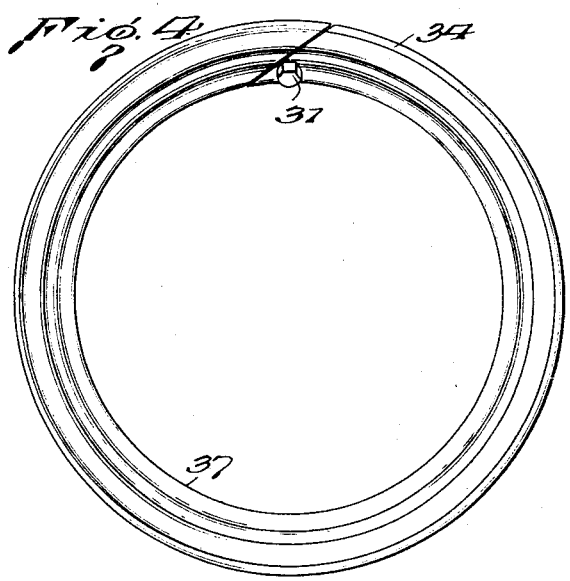
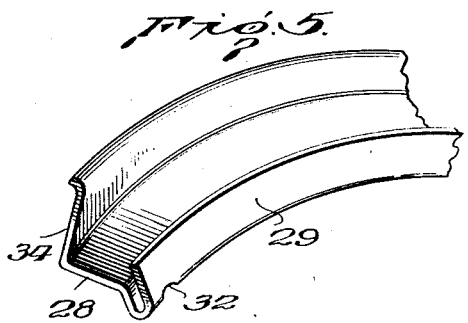
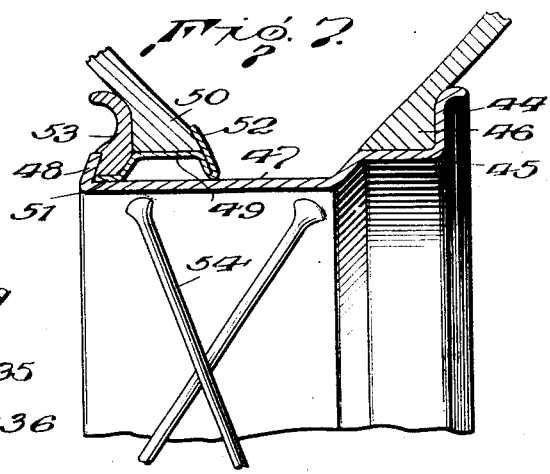
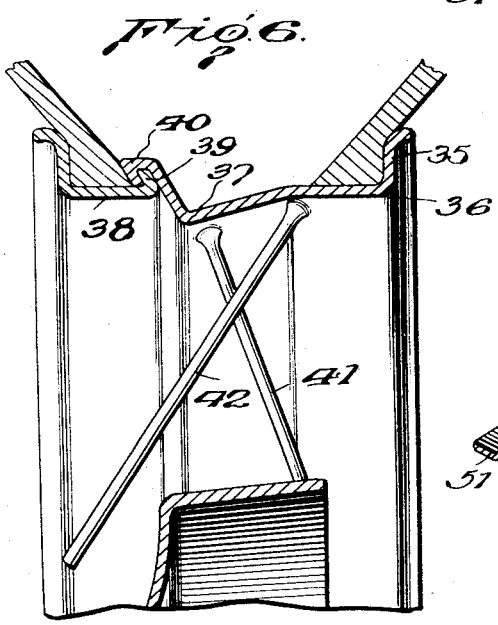
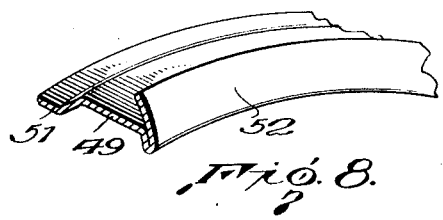
Inventor
James H. Wagenhorst,
By Church & Church
His Attorneys Patented Dec. 19, 1933

1,939,935

UNITED STATES PATENT OFFICE 1,939,935

VEHICLE WHEEL

James H. Wagenhorst, Detroit, Mich., assignor, by mesne assignments, to Kelsey-Hayes Wheel Company, Detroit, Mich., a corporation of Delaware Application September 1, 1931. Serial No. 560,637

10 Claims. (Cl. 152—21)

My invention relates to improvements in vehicle wheels, and has to do, more particularly, with vehicle wheels of the type having a drop base portion into which the tire beads are receivable to facilitate removal of the tire from the rim.

Automobile wheels of the drop base type have become very popular due to their beauty, strength and low cost. However, these wheels have several serious disadvantages. Probably the most serious of these is the tendency of the tire beads to slip into the drop portion of the rim when deflation of the tire occurs during operation of the vehicle. Under such circumstances the inner tube is almost always torn or cut before the vehicle can be brought to a stop. Frequently, the casing also is injured, and may even come off the wheel, and it is not unusual for the driver to lose control if the vehicle is traveling at a high rate of speed. Another disadvantage with this form of wheel is that tires, when new, are stiff and unstretched, and are exceedingly difficult to press on or pull from, such rims. It may be necessary to use a tire tool, in which event the finish of the rim flange is invariably injured, so that unsightly rusty spots soon appear. Furthermore, if unskilfully manipulated, a tool used in mounting a tire upon a drop base rim is very likely to pinch the inner tube.

The primary object of my invention is, therefore, to provide a drop base wheel rim of such form that the beads of the tire mounted thereon will not work their way into the drop base portion when the tire becomes deflated during operation of the vehicle.

Another important object of my invention is to provide a drop base wheel rim with which no tire tool need be used to remove or install even a new tire.

It is an object of my invention to eliminate destructive "creep" of tires upon their rims.

It is an object of my invention to provide a novel Q. D. type of rim employing a removable flange which may be formed from flat sheet stock.

It is an object of my invention to provide a Q. D. type of rim in which the edge of the retaining channel for the removable flange is not only protected from injury, but is concealed, giving the rim a sturdy and beautiful one-piece appearance.

It is an object of my invention to provide a Q. D. type of rim having a removable flange which constitutes substantially the entire outboard portion of the rim, and which may be plated with metal of high lustre to furnish a broad trim for the wheel.

It is an object of my invention to provide a wire wheel construction having a drop base portion adjacent its forward edge to which the outer ends of the rear series of spokes may be anchored with ample inclination.

It is an object of my invention to provide a novel drop base type of rim in which the beads of the tire are normally retained upon their ledges, yet may readily be displaced therefrom to permit removal of the tire for replacement or repair.

Further objects, and objects relating to details and economies of construction and operation will definitely appear from the detailed description to follow. In one instance, I accomplish the objects of my invention by the devices and means set forth in the following specification. My invention is clearly defined and pointed out in the appended claims. Structures constituting preferred embodiments of my invention are illustrated in the accompanying drawings forming a part of my invention, in which:

Figure 1 is a sectional view through the center of a wire wheel embodying my invention;

Fig. 2 is a view of the rim portion of the wheel in side elevation, the Q. D. flange being detached;

Fig. 3 is a fragmentary sectional view of a somewhat modified form of wheel showing the construction of the detachable flange and tire bead retaining member;

Fig. 4 is a view, in front elevation, of the rim construction shown in Fig. 3;

Fig. 5 is a view, in perspective, of a portion of the detachable flange forming a part of the rim construction illustrated in Figs. 3 and 4;

Fig. 6 is a fragmentary sectional view of a wheel involving a slightly modified form of rim, the drop base portion of which is narrow and located adjacent the outboard edge of the rim;

Fig. 7 is a fragmentary sectional view of a modified form of rim embodying my invention, in which the drop base portion of the rim extends to the extreme outboard edge of the rim, a distinct ledge is provided for one tire bead, and a Q. D. type of flange retains the tire bead upon the ledge; and Fig. 8 is a perspective view of a portion of the bead ledge used in the rim construction shown in Fig. 7.

In the drawings, the same reference numerals refer to the same parts throughout the several views.

In general, my invention consists in forming a tire-carrying rim with a shallow drop base portion, a low retaining flange for preventing the outboard tire bead from slipping into the drop base portion, and a Q. D. flange for retaining the outboard tire bead upon the rim.

Referring to the drawings, and more particularly, to Figs. 1 and 2, I have shown an embodiment of my invention in the form of a wire wheel comprising a hub 10, an inner series of wire spokes 11, an outer series of spokes 12, and a rim 13 to which the outer ends of the spokes 11 and 12 are anchored. The rim 13 comprises a tire-retaining flange 14, a ledge 15 for supporting the inboard bead 16 of a pneumatic tire, a drop base portion 17, a ledge 18 for supporting the outboard bead 19 of the tire, a flange 20 at the junction of the ledge 18 and drop base portion 17, and a channel or trough portion 21, in which a Q. D. type flange 22, which holds the tire bead 19 upon the rim, is received. The flange 20 prevents the tire bead 19 from slipping into the drop base portion 17. It is preferably inclined to conform snugly to the inner surface of the tire bead 19, providing friction therewith, thereby reducing the tendency of the tire to creep upon the rim and offering a broad smooth surface to the inner tube so that chafing will not occur. The flange 20 may be formed integrally with the rim by cold-rolling the blank before its formation into the finished rim, as will be apparent to those skilled in the art. It is preferably of a height equal to about one-half the height of the flange 14. Using a drop base portion 17, equal in depth to the height of the flange 20, the inboard tire bead 16 may be readily pulled over the flange in the usual manner employed in removing tires from drop center rims, that is, by allowing a portion of the bead to be in the drop base while the diametrically opposite portion of the bead is drawn over the flange. Thus, it will be seen that tire removal is greatly facilitated and the tendency toward tire "creep" is eliminated. Further, since one tire bead is maintained upon its ledge, the tire as a whole is held concentrically upon the rim, and the other tire bead, though unanchored, has little or no tendency to slip into the drop base portion of the rim.

In Figs. 3, 4 and 5, there is disclosed a somewhat modified rim construction which comprises a tire-retaining flange 24, a ledge 25 for supporting the inboard bead 26 of a tire, a drop base portion 27, a channel member 30, opening radially inwardly, and a detachable bead support 28. The support 28 is provided with a radially outwardly extending flange portion 29, which is received in the channel 30, and is maintained therein by a cap screw 31 threaded into the drop base portion 27, and engaging the notch 32 in the support 28. The threads of the aperture in the drop base portion 27 are preferably augmented by threads in a rounded nut-like plate 31a, which is welded to the drop base portion, so that firm anchorage of the stud 31 is assured. The outboard bead 33 of the tire rests upon the cylindrical portion of the support 28, and is retained thereon by the integral flange 34. The bead 33 is prevented from slipping into the drop base portion 27 of the rim by the channel member 30, which serves the function of the flange 20 in the embodiment disclosed in Figs. 1 and 2. To remove a tire from this form of rim, the screw 31 is first removed, then the annular member 28 is contracted by prying the notched end thereof radially inwardly, and progressively peeling the flange 29 out of the channel 30 until support 28 is detached from the rim proper. After this operation has been performed, all that remains to be done is to pull the inboard tire bead 26 from the rim proper. As in the case of the embodiment disclosed in Figs. 1 and 2, a portion of the inboard bead is disposed in the drop base portion 27 while the diametrically opposite portion of the bead is slipped over the retaining flange constituted by the channel member 30.

In Fig. 6, there is shown a slightly modified construction which is fundamentally similar to that disclosed in Fig. 3, except for the fact that the drop portion of the base is restricted to the zone immediately adjacent the channel member which receives the detachable support 38 for the outboard tire bead 33. This rim construction comprises a tire-retaining flange 35, a rim base comprising a bead supporting portion 36 and a drop portion 37 adjacent the channel portion 40 in which the flange 39 of the detachable tire bead support 38 is retained. One advantage of this construction is that the outer ends of the inner series of spokes 41 may be placed in the drop portion well toward the outboard edge of the wheel, providing ample spoke inclination without the requirement of offsetting the rim with respect to the hub. Furthermore, this portion of the rim base is substantially square with the spokes so that the heads may be very firmly anchored. In this construction, the ledge for the inboard tire bead extends to the center of the wheel, further insuring that the bead will not slip into the drop base portion of the rim when the tire becomes deflated.

In Figs. 7 and 8, there is shown a modification of the construction shown in Fig. 1. The rim comprises a tire-retaining flange 44, a ledge 45 upon which the inboard bead 46 of the tire is supported, a base portion 47 of smaller diameter than the ledge 45, a low, upturned flange 48 at the outboard edge of the base 47, a raised support 49 for the outboard tire bead 50, having at one edge, a foot portion 51 abutting the flange 48 and secured to the base 47, as by welding, and having at the other edge, a flange 52 doubled back upon said support 49 and extending radially outwardly therefrom in conformity with the inner side of the tire bead 50, and preventing its slippage into the drop base portion 47. A Q. D. flange 53 is received in the channel constituted by the flange 48, bead support 49 and foot portion 51, which Q. D. flange bears snugly against the outside surface of the tire bead 50, maintaining frictional contact between the bead 50 and flanges 52 and 53 to the prevention of tire creep. The heads on the outer ends of the inner series of spokes 54 in this form of wheel are accommodated in the space provided beneath the bead-supporting member 49. As shown, the bead-supporting member 49, its foot portion 51, and the retaining flange 52 are all capable of formation from a single strip of comparatively light gauge sheet material. Removal of the tire from a rim of this construction is effected in substantially the same manner as with the other constructions disclosed. The flange 53 is detached, the outboard bead of the tire is pulled from the ledge 49, and a portion of the inboard bead 46 is disposed in the drop portion 47 of the rim while the diametrically opposite portion of the bead is pulled over the flange 50.

While I have disclosed several embodiments of my invention for the purpose of illustration, it is to be distinctly understood that many novel features of this invention may be embodied to similar advantage in wheels of the disc and artillery types. Similarly, certain of the novel features of the detachable tire-retaining flange herein disclosed are capable of embodiment in rims not provided with drop base portions. The structure herein disclosed may be varied in other particulars without departing from the spirit of my invention. I, therefore, claim my invention broadly, as indicated by the appended claims.

What I claim is:

1. A wheel rim for use with pneumatic tires comprising a base portion less in diameter than the beads of the tire to be carried and into which a portion of one bead of the tire is receivable for facilitating removal thereof, ledge portions of increased diameter at each edge of said base portion and upon which the tire beads are normally mounted, one of said ledge portions having a plane upper surface connecting into said base portion to provide for ready movement of the tire bead normally mounted thereon to said base portion, radial flanges at the edges of the rim which are of greater diameter than the tire beads and retain the tire upon the rim, said flange removed from said plane upper surfaced ledge portion being detachable to permit removal of the tire, and a radially extending flange at the junction of said base portion and the ledge adjacent the detachable flange, which radially extending flange prevents the tire bead disposed on said ledge from slipping into said base portion when the tire is deflated and each radially extending flange has a head permitting buttoning thereover the tire bead normally mounted on said plane upper surfaces ledge portion.

2. A wheel rim for use with pneumatic tires comprising a base portion less in diameter than the beads of the tire to be carried and into which a portion of one bead of the tire is receivable for facilitating removal thereof, ledge portions of increased diameter at each edge of said base portion and upon which the tire beads are normally mounted, one of said ledge portions having a plane upper surface connecting into said base portion to provide for ready movement of the tire bead normally mounted thereon to said base portion, radial flanges at the edges of the rim which are of greater diameter than the tire beads and retain the tire upon the rim, said flange removed from said plane upper surfaced ledge portion being detachable to permit removal of the tire, and an integral radially extending flange at the junction of said base portion and the ledge adjacent the detachable flange which integral flange prevents the tire bead disposed on said ledge from slipping into said base portion when the tire is deflated and each radially extending flange has a head permitting buttoning thereover the tire bead normally mounted on said plane upper surfaces ledge portion.

3. A wheel rim for use with pneumatic tires comprising a base portion less in diameter than the beads of the tire to be carried, means at one edge of the rim base for supporting and retaining one tire bead, a flange extending radially outwardly from the other edge of the rim base, a ledge member for supporting the other tire bead, a radially outwardly extending flange at the inner edge of said ledge member, and a detachable flange seated between the flange of the rim base and said ledge member and extending radially outwardly therefrom.

4. A wheel rim for use with pneumatic tires comprising a base portion less in diameter than the beads of the tire to be carried, means at one edge of the rim base for supporting and retaining one tire bead, a flange extending radially outwardly from the other edge of the rim base, an annular bead supported ledge member of channel cross section mounted upon said rim base and spaced inwardly from said flange, a radially outwardly extending flange at the inner edge of said ledge member, and a detachable flange snugly seated in the space between said ledge member and the flange of the rim base.

5. A wheel rim for use with pneumatic tires comprising a base portion less in diameter than the beads of the tire to be carried, means at one edge of the rim base for supporting and retaining one tire bead, a flange extending radially outwardly from the other edge of the rim base, an annular ledge member for supporting the other tire bead secured to said base portion adjacent to but spaced from said flange to provide a channel therebetween, a detachable flange seated in said channel and extending radially outwardly adjacent the outer edge of said ledge member, and a flange extending radially outwardly from the inner edge of said ledge member, said two last mentioned flanges and ledge member providing a channel within which the associated tire bead is snugly and firmly held against radial, lateral, and circumferential movement.

6. A wheel rim for use with pneumatic tires, comprising a base portion less in diameter than the beads of the tire to be carried and into which a portion of one bead of the tire is receivable for facilitating removal of the tire, a ledge portion of increased diameter at one edge of said base portion and upon which one bead of the tire is adapted to be mounted, a radial flange at the free edge of said ledge portion for retaining the tire, a second radial flange at the other edge of said base portion, and means at the last mentioned edge for supporting and retaining the other bead of the tire, comprising a ledge member encircling said base portion adjacent to said second flange and having an increased diameter upon which the last mentioned bead of the tire is adapted to be mounted.

7. A wheel rim for use with pneumatic tires, comprising a base portion less in diameter than the beads of the tire to be carried and into which a portion of one bead of the tire is receivable for facilitating removal of the tire, a ledge portion of increased diameter at one edge of said base portion and upon which one bead of the tire is adapted to be mounted, a radial flange at the free edge of said ledge portion for retaining the tire, a second radial flange at the other edge of said base portion, means at the last mentioned edge for supporting and retaining the other bead of the tire, comprising a ledge member encircling said base portion adjacent to said second flange and having an increased diameter upon which the last mentioned bead of the tire is adapted to be mounted, and a detachable flange between said second flange and said ledge member for detachably retaining the tire.

8. A wheel rim for use with pneumatic tires comprising a base portion less in diameter than the beads of the tire to be carried, means at one edge of the rim base for supporting and retaining one tire bead, a radially outwardly extending flange at the other edge of the rim base terminating in a radially inwardly extending flange spaced from said radially outwardly extending flange and constituting therewith a radially inwardly opening channel external of the recess constituted by the rim base portion of reduced diameter, a detachable ledge member for supporting the other tire bead, a radially outwardly extending flange at the outer edge of the ledge member for retaining the tire bead on the ledge and a second radially outwardly extending flange at the inner edge of said bead, said second flange being receivable in the radially inwardly opening channel, and means for securing the ledge member and its two associated flanges against disassociation from the rim proper.

9. A wheel rim for use with pneumatic tires comprising a base portion less in diameter than the beads of the tire to be carried, means at one edge of the rim base for supporting and retaining one tire bead, a radially outwardly extending flange at the other edge of the rim base terminating in a radially inwardly extending flange spaced from said radially outwardly extending flange and constituting therewith a radially inwardly opening channel external of the recess constituted by the rim base portion of reduced diameter, a detachable ledge member for supporting the other tire bead, a radially outwardly extending flange at the outer edge of the ledge member for retaining the tire bead on the ledge and a second radially outwardly extending flange at the inner edge of said bead, said second flange being receivable in the radially inwardly opening channel, said ledge member and its two associated flanges being in the form of a transversely split annulus, and a bolt threaded in the base portion of the rim and engaging said ledge member and retaining said second ledge member in said channel.

10. A wire spoked wheel for use with pneumatic tires comprising a hub, a rim concentrically disposed about said hub, a series of spokes lacing the outboard portion of said hub to the inboard portion of said rim, a rim base portion less in dameter than the beads of the tire to be carried and inclined to present a substantially perpendicular anchorage bearing for the outer ends of a second series of spokes lacing said base to the inboard portion of said hub, means at inboard edge of the rim base for supporting and retaining the inboard tire bead, a flange extending radially outwardly from the outboard edge of the inclined base portion and terminating in a radially inwardly extending flange spaced from said radially outwardly extending flange and constituting therewith a radially inwardly opening channel defining the outboard edge of the rim proper, a detachable ledge member for supporting the outboard tire bead, a radially outwardly extending flange at the outer edge of the ledge member for retaining the tire bead on the ledge and a second radially outwardly extending flange at the inner edge of said bead, said second flange being receivable in the radially inwardly opening channel, and means for securing the ledge member and its two associated flanges against disassociation from the rim proper.

JAMES H. WAGENHORST.